United States Patent
Dea

(10) Patent No.: US 10,762,198 B1
(45) Date of Patent: Sep. 1, 2020

(54) ARTIFICIAL INTELLIGENCE SYSTEM AND METHOD FOR INSTANTLY IDENTIFYING AND BLOCKING UNAUTHORIZED CYBER INTERVENTION INTO COMPUTER APPLICATION OBJECT CODE

(71) Applicant: Richard Dea, Blue Ridge, GA (US)

(72) Inventor: Richard Dea, Blue Ridge, GA (US)

( * ) Notice: Subject to any disclaimer, the term of this patent is extended or adjusted under 35 U.S.C. 154(b) by 0 days.

(21) Appl. No.: 16/723,604

(22) Filed: Dec. 20, 2019

Related U.S. Application Data

(60) Provisional application No. 62/905,775, filed on Sep. 25, 2019.

(51) Int. Cl.
| | |
|---|---|
| *G06F 11/00* | (2006.01) |
| *G06F 21/53* | (2013.01) |
| *H04L 29/06* | (2006.01) |
| *G06N 20/00* | (2019.01) |
| *G06F 12/14* | (2006.01) |

(52) U.S. Cl.
CPC .......... *G06F 21/53* (2013.01); *G06N 20/00* (2019.01); *H04L 63/0272* (2013.01); *H04L 63/10* (2013.01); *G06F 2221/033* (2013.01)

(58) Field of Classification Search
CPC .. G06F 21/10; G06F 12/0802; G06F 12/0888; G06F 12/1027; G06F 12/1408; G06F 2212/1052; G06F 2212/402
See application file for complete search history.

(56) References Cited

U.S. PATENT DOCUMENTS

| | | | | |
|---|---|---|---|---|
| 5,204,952 A | * | 4/1993 | Ayers | G06F 1/12 714/12 |
| 6,950,867 B1 | * | 9/2005 | Strohwig | G06F 21/10 709/223 |
| 7,392,541 B2 | * | 6/2008 | Largman | G06F 21/53 726/17 |
| 8,918,838 B1 | * | 12/2014 | Baldonado | H04L 63/20 726/1 |
| 2003/0046238 A1 | * | 3/2003 | Nonaka | H04H 60/18 705/51 |
| 2009/0316889 A1 | * | 12/2009 | Macdonald | G06F 21/10 380/201 |
| 2016/0205122 A1 | * | 7/2016 | Bassett | G06F 21/577 726/23 |
| 2016/0378690 A1 | * | 12/2016 | Kiperberg | G06F 12/0802 713/193 |

* cited by examiner

*Primary Examiner* — Gary S Gracia
(74) *Attorney, Agent, or Firm* — Malloy & Malloy, P.L.

(57) ABSTRACT

An artificial intelligence system and method securely stores all executable binary object code of a client/user's computer-based software applications in a separate and impenetrable Sealed-off Central Processing Unit (SCPU). The SCPU is shielded from any external communication interface by having no input ports or devices able to receive external transmissions. The SCPU executes four primary functions: 1. constantly reads all the primary object code in the client/user's application system; 2. simultaneously compares and matches the application system executable object code to the shielded executable object code copy stored in the SCPU; 3. permanently blocks the unmatched object code section(s) pending internal IT security team review of the unmatched object code; and, 4. notifies the client/user's authorized IT security authority of the blocked object code section(s) and submits to them a copy of the potentially invalid object code.

6 Claims, 1 Drawing Sheet

1 - Constant Reading of the Active Client System's Object Code
2 - Instant Blocking of all Unmatched Object Code
3 - Blocked Client System's Object Code Transmitted to the SCPU
4 - Object Code Data Copy Sent to IT Security

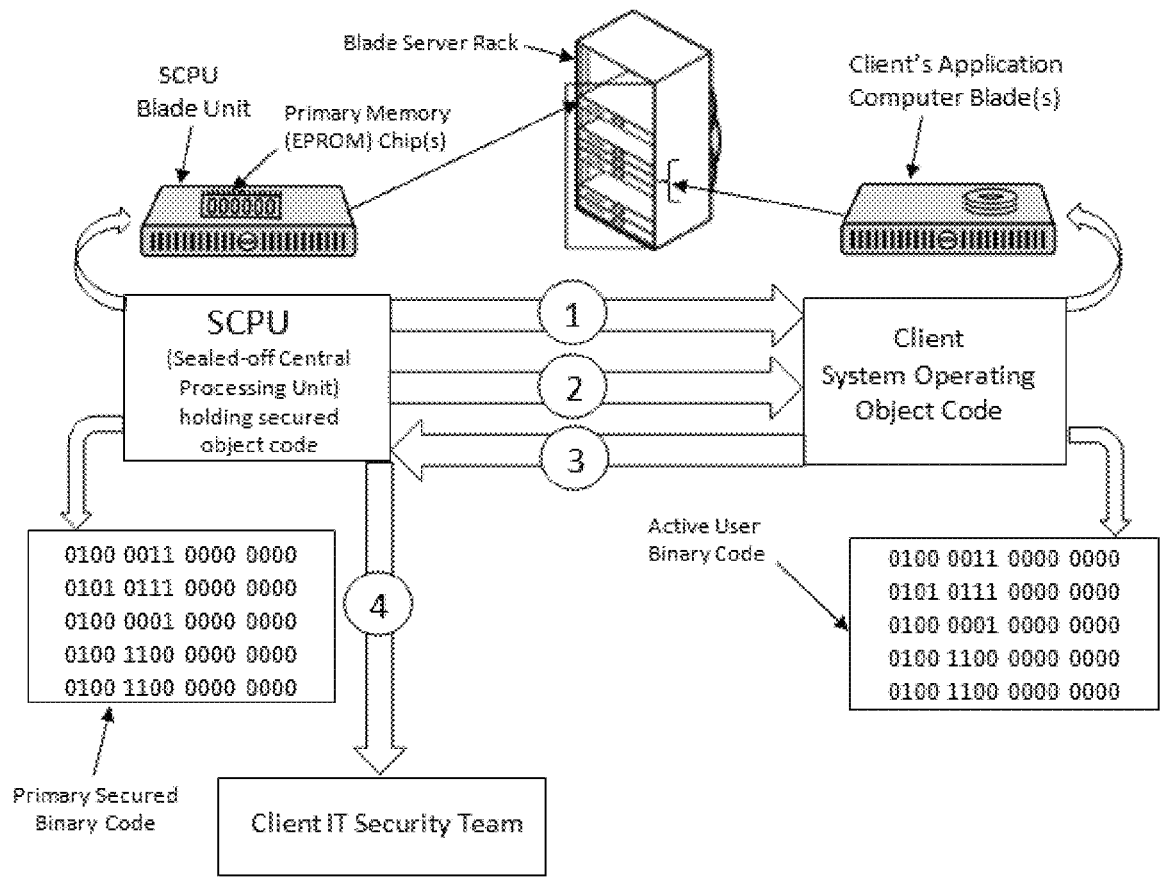

ARTIFICIAL INTELLIGENCE SYSTEM AND METHOD FOR INSTANTLY IDENTIFYING AND BLOCKING UNAUTHORIZED CYBER INTERVENTION INTO COMPUTER APPLICATION OBJECT CODE

BACKGROUND OF THE INVENTION

This non-provisional patent application is based on provisional patent application Ser. No. 62/905,775 filed on Sep. 25, 2019.

FIELD OF THE INVENTION

The invention relates to an artificial intelligence system and method for immediately identifying and blocking extrinsic computer software object code incursions.

DISCUSSION OF THE RELATED ART

Cyber attacks on confidential application software and related data are fraudulently executed by multiple invasion mechanisms. These mechanisms not only massively exist but are under continuous new development from sources worldwide.

Currently, there are no existing security programs capable of entirely impeding cyber attacks. Most existing patented information security solutions have been primarily focused on highly advanced system engineering and development designed to detect a limited variety of transpired hacking techniques (e.g. known virus scans and protection, subsequent malware removal, ransomware withdrawal, firewalls, etc.). These designs only function to identify existing cyber incursions and subsequently identify similar future reoccurrences of the cyber intervention attacks. The present invention prevents all unauthorized attempts at cyber intervention (in advance) regardless of existing, new or future renditions to the client/user's information systems by immediately blocking any and all internal and external cyber infiltrations regardless of the breaching source.

SUMMARY OF THE INVENTION

An artificial intelligence system and method for instantly blocking all forms of cyber attack attempts on computer-based software applications securely stores all of the executable binary object code of a client/user's computer-based software applications in a separate and impenetrable Sealed-off Central Processing Unit (SCPU). The SCPU is shielded from any external communication interface by having no input ports or devices able to receive external transmissions. The object code copy that is set in a file and stored in the SCPU can only be modified by direct physical access to the SCPU hardware. The SCPU executes four primary functions: 1. constantly reads all the primary object code in the client/user's application system; 2. simultaneously compares and matches the application system executable object code to the shielded executable object code copy stored in the SCPU; 3. permanently blocks the unmatched object code section(s) pending internal IT security team review of the unmatched object code; and, 4. notifies the client/user's authorized IT security authority of the blocked object code section(s) and submits to them a copy of the potentially invalid object code.

BRIEF DESCRIPTION OF DRAWING

For a fuller understanding of the present invention reference should be made to the following detailed description taken in conjunction with the accompanying drawing in which:

FIG. 1 is a schematic diagram illustrating the primary components, interfaces and operational steps according to a preferred embodiment of the system and method of the present invention.

DETAILED DESCRIPTION

Referring to FIG. 1, the artificial intelligence system securely stores all of the executable binary object code of a client/user's computer-based software applications in a separate and impenetrable Sealed-off Central Processing Unit (SCPU). The SCPU is shielded from any external communication interface by having no input ports or devices able to receive external transmissions. The object code copy that is set in a file and stored in the SCPU can only be modified by direct physical access to the SCPU hardware. The SCPU executes four primary functions: 1. constantly reads all the primary object code in the client/user's application system; 2. simultaneously compares and matches the application system executable object code to the shielded executable object code copy stored in the SCPU; 3. permanently blocks the unmatched object code section(s) pending internal IT security team review of the unmatched object code; and, 4. notifies the client/user's authorized IT security authority of the blocked object code section(s) and submits to them a copy of the potentially invalid object code.

The artificial intelligence system performs immediate and repetitive (at frequent intervals) reading of the client's system-based binary object code. Because of the velocity of the constant repetition of the SCPU reading and matching incurred by this process, it is virtually impossible for an outsider (cyber hacker) or insider to affect program integration to the Client's object code. The SCPU's blocking procedure eliminates the ability of the cyber hacker to complete activation of its hacking code or even come close to executing its code to access the Client's database. Before any illegitimate data access can be achieved, any and all triggered trespassing object code is blocked. Therefore, any segment(s) of binary object code detected in the client's functional system-based object code which does not match the binary object code secured in the SCPU is immediately blocked, intercepted and separately recorded for submission to the Client's IT Security Team. The SCPU software program notifies the client/user's IT security member(s) through either a private network or a virtual private network (VPN) and transfers a copy of the unmatched binary object code along with the entry time/date and interface source ID (encrypted). Any un-matching binary object code segment(s) detected remains blocked in the client's system unless and until authorized IT security authorities directly insert legitimate unmatched executable code directly into the SCPU erasable program read-only memory (EPROM) chip(s). The entire read and match program process is stored in and executed from the SCPU's EPROM. The only interface access to the SCPU binary application code is through direct interface between IT Security and the SCPU's EPROM chip; there are no other existing communication interfaces with the SCPU. This program process detects and eliminates attacks from both outside third-party hackers as well as current and former internal based hacking infiltrators (employees or contractors).

What is claimed is:

1. An artificial intelligence system comprising:
a client operating system containing executable binary object code of a client/user's computer-based software applications;
a sealed-off central processing unit (SCPU) that securely stores all of the executable binary object code of the client/user's computer-based software applications, the sealed-off central processing unit being shielded from all external communication interfaces and having no input ports or devices able to receive external transmissions wherein the only interface access to the SCPU is through direct physical access to SCPU hardware;
the sealed-off central processing unit continuously reads all of the binary object code in the client/user's operating system and simultaneously compares and matches the application system executable object code to the shielded executable binary object code stored in the sealed-off central processing unit;
and the sealed-off central processing unit permanently blocks any unmatched object code on the client operating system and notifies the client/user's authorized IT security authority of the blocked object code via a network.

2. The artificial intelligence system as recited in claim 1 wherein the sealed-off central processing unit notifies the client/user's IT security authority through a private network and transfers a copy of the unmatched binary object code with the entry time and date and encrypted interface source ID to the authorized IT security authority.

3. The artificial intelligence system as recited in claim 1 wherein the sealed-off central processing unit notifies the client/user's IT security authority through a virtual private network and transfers a copy of the unmatched binary object code with the entry time and date and encrypted interface source ID to the authorized IT security authority.

4. The artificial intelligence system as recited in claim 1 wherein the sealed-off central processing unit includes at least one erasable program read-only memory chip.

5. The artificial intelligence system as recited in claim 4 wherein the sealed-off central processing unit is structured to limit interface access only by direct interface between the authorized IT security authority and the sealed-off central processing unit's at least one erasable program read-only memory chip.

6. The artificial intelligence system as recited in claim 1 wherein the sealed-off central processing unit permanently blocks any unmatched object code on the client operating system and notifies the client/user's authorized IT security authority of the blocked object code via a private network and transfers a copy of the unmatched binary object code.

* * * * *